US009116670B2

(12) United States Patent
Jenkins et al.

(10) Patent No.: US 9,116,670 B2
(45) Date of Patent: Aug. 25, 2015

(54) SURFACE CONTACT FOR A SUPPORT COMPONENT

(71) Applicant: Microsoft Corporation, Redmond, WA (US)

(72) Inventors: Kurt Allen Jenkins, Sammamish, WA (US); Joseph B. Gault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 13/924,141

(22) Filed: Jun. 21, 2013

(65) Prior Publication Data

US 2014/0376179 A1    Dec. 25, 2014

(51) Int. Cl.
*G06F 1/16* (2006.01)
*G06F 1/18* (2006.01)

(52) U.S. Cl.
CPC ............ *G06F 1/1679* (2013.01); *G06F 1/1681* (2013.01); *G06F 1/181* (2013.01)

(58) Field of Classification Search
CPC ...................................... G06F 1/1626
USPC ..................................... 361/679.59
See application file for complete search history.

(56) References Cited

U.S. PATENT DOCUMENTS

| | | | |
|---|---|---|---|
| 6,507,485 B2 | 1/2003 | Zadesky | |
| 7,120,972 B2 | 10/2006 | O'Banion | |
| 7,517,222 B2 | 4/2009 | Rohrbach et al. | |
| 7,541,907 B2 * | 6/2009 | Wang et al. | 335/305 |
| 7,817,004 B2 | 10/2010 | Fullerton et al. | |
| 8,390,411 B2 * | 3/2013 | Lauder et al. | 335/219 |
| 8,884,730 B2 * | 11/2014 | Lauder et al. | 335/219 |
| 8,928,437 B2 * | 1/2015 | Lauder et al. | 335/219 |
| 2012/0068798 A1 | 3/2012 | Lauder et al. | |
| 2012/0233835 A1 | 9/2012 | Tolentino | |
| 2013/0050973 A1 | 2/2013 | Rohrbach | |
| 2013/0163197 A1 * | 6/2013 | Mack et al. | 361/679.56 |
| 2014/0098478 A1 * | 4/2014 | Gallagher et al. | 361/679.02 |
| 2014/0159839 A1 * | 6/2014 | Kim | 335/219 |

OTHER PUBLICATIONS

Stumpf, James, "Levitatr: A Keyboard with Elevating Keys for iPad, Tablets", Retrieved at <<http://www.kickstarter.com/projects/1372319351/levitatr-a-keyboard-with-elevating-keys-for-ipad-t>>, Sep. 23, 2011, pp. 10.

* cited by examiner

*Primary Examiner* — Anthony Q Edwards
(74) *Attorney, Agent, or Firm* — Jeremy Snodgrass; Judy Yee; Micky Minhas

(57) ABSTRACT

A surface contact for a support component is described. The support component, for example, can serve as a "kickstand" that can be positioned to support the apparatus in a variety of orientations relative to an adjacent surface. A surface contact disposed on the support component can serve as an interface (e.g., a "foot") for the support component on the adjacent surface. For instance, the surface contact can be formed from a slip-resistant material such that slippage of the support component on an adjacent surface is reduced or eliminated. In at least some embodiments, the surface contact is embedded with a material that responds to a magnetic field, e.g., a ferromagnetic material. The surface contact is attracted to magnets on an adjacent edge of the attached apparatus, thus stabilizing the support component in a closed position.

20 Claims, 7 Drawing Sheets

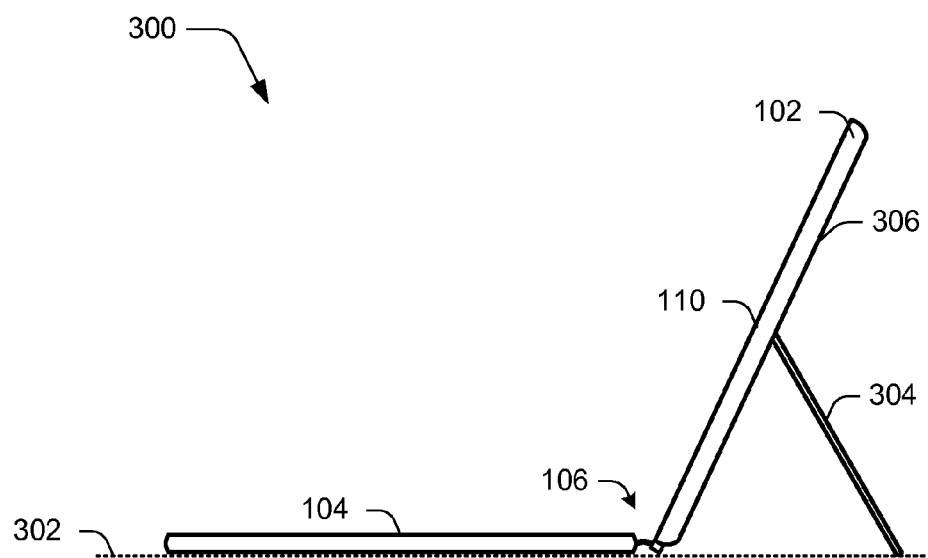

SURFACE CONTACT FOR A SUPPORT COMPONENT

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, however, the devices are typically designed to be used in a handheld manner. Typical ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A surface contact for a support component is described. In at least some implementations, a support component is attached to an apparatus (e.g., a computing device) via a hinge mechanism. The support component can serve as a "kickstand" that can be positioned to support the apparatus in a variety of orientations relative to an adjacent surface. A surface contact disposed on the support component can serve as an interface (e.g., a "foot") for the support component on the adjacent surface. For instance, the surface contact can be formed from a slip-resistant material such that slippage of the support component on an adjacent surface is reduced or eliminated. This stabilizes the support component, and thus provides for stability of the attached apparatus.

In at least some embodiments, a surface contact of a support component is embedded with a material that responds to a magnetic field, e.g., a ferromagnetic material. Further, an apparatus to which the support component is attached includes a magnetic structure at or near a peripheral edge. Thus, when the support component is in a closed position relative to the apparatus, the magnetic structure exerts an attractive magnetic force on the surface contact. The magnetic force holds the support component against the apparatus, such as to prevent unwanted movement (e.g., accidental opening) of the support component. Thus, in at least some embodiments, the magnetic structure holds the support component in a closed position until a user applies force to the support component to move the component to an open position.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 depicts an example orientation of an input device in relation to a computing device in accordance with one or more embodiments.

FIG. 3 depicts an example orientation of an input device and a support component in relation to a computing device in accordance with one or more embodiments.

DETAILED DESCRIPTION

Overview

A surface contact for a support component is described. In at least some implementations, a support component is attached to an apparatus (e.g., a computing device) via a hinge mechanism. The support component can serve as a "kickstand" that can be positioned to support the apparatus in a variety of orientations relative to an adjacent surface. A surface contact disposed on the support component can serve as an interface (e.g., a "foot") for the support component on the adjacent surface. For instance, the surface contact can be formed from a slip-resistant material such that slippage of the support component on an adjacent surface is reduced or eliminated. This stabilizes the support component, and thus provides for stability of the attached apparatus.

In at least some embodiments, a surface contact of a support component is embedded with a material that responds to a magnetic field, e.g., a ferromagnetic material. Further, an apparatus to which the support component is attached includes a magnetic structure at or near a peripheral edge. Thus, when the support component is in a closed position relative to the apparatus, the magnetic structure exerts an attractive magnetic force on the surface contact. The magnetic force holds the support component against the apparatus, such as to prevent unwanted movement (e.g., accidental opening) of the support component. Thus, in at least some embodiments, the magnetic structure holds the support component in a closed position until a user applies force to the support component to move the component to an open position.

In the following discussion, an example environment is first described that may employ the techniques described herein. Embodiments discussed herein are not limited to the example environment, and the example environment is not limited to embodiments discussed herein. Next, a section titled "Support Component" describes some example implementations of a support component and surface contacts for the support component in accordance with one or more embodiments. Finally, an example system and device are discussed that may implement various techniques described herein.

Example Environment

Figure 1:
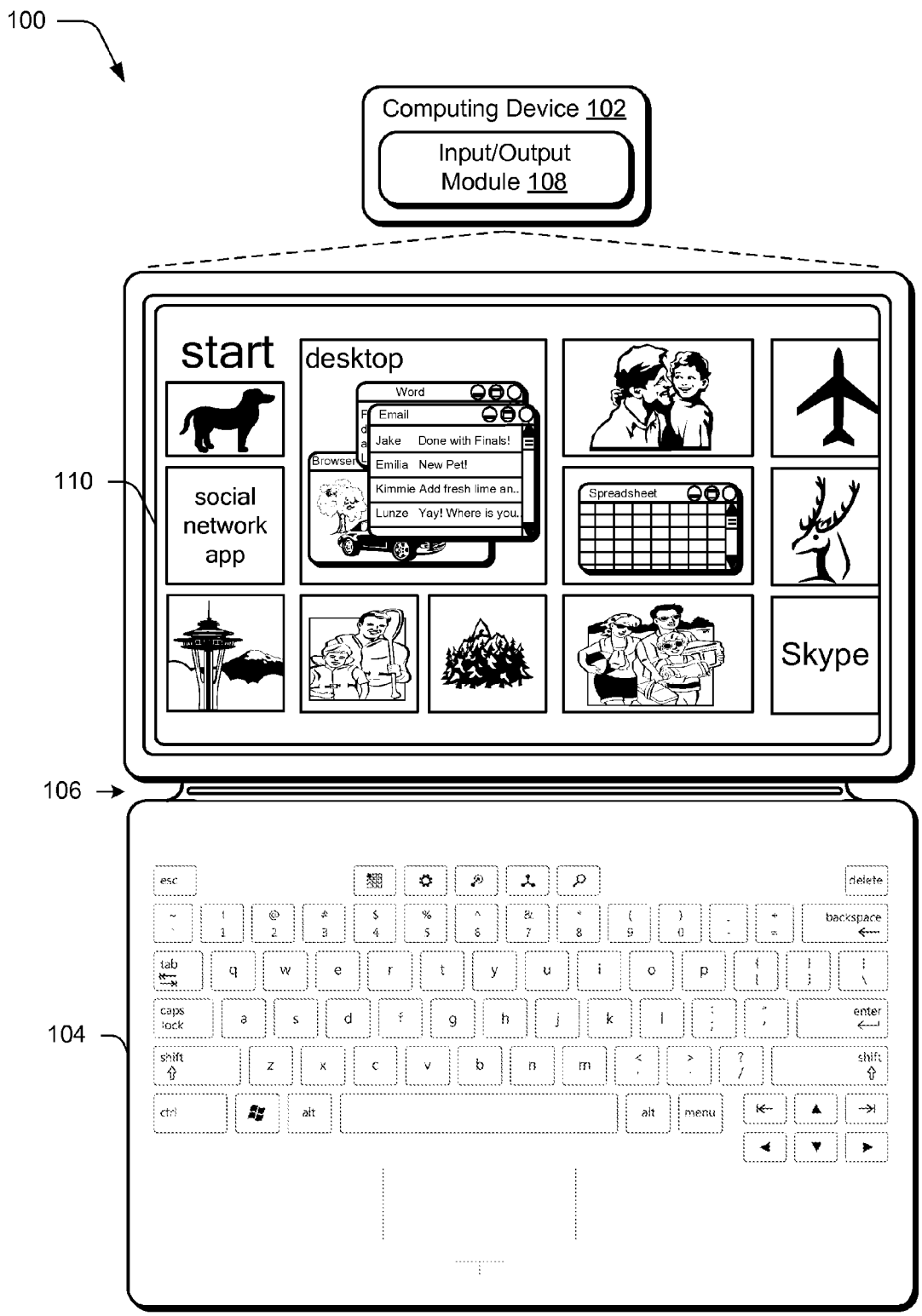
FIG. 1 is an illustration of an environment in an example implementation that is operable to employ the techniques described herein in accordance with one or more embodiments.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 is operably associated with software that causes the computing device 102 to perform one or more operations. An example implementation of the computing device 102 is discussed below with reference to FIG. 9.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

As further discussed below, the computing device 102 includes a support component that enables various operating positions for the computing device 102.

Support Component

Through rotational movement of the flexible hinge 106, a variety of different orientations of the input device 104 in relation to the computing device 102 may be supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

FIG. 3 illustrates a side view of an example open position 300 for the computing device 102. In the position 300, the input device 104 is laid flat against a surface 302, such as a desk, a table, and so forth. The computing device 102 is disposed at an angle to permit viewing of the display device 110 through use of a kickstand 304 disposed on a rear surface 306 of the computing device 102. Generally, the kickstand 304 is formed via a planar portion of material, such as instances and/or combinations of plastic, metal, various alloys, carbon fiber, and so forth. As detailed below, the kickstand 304 serves as a support component that can be moved to various orientations with respect to the computing device 102 to support different operating positions for the computing device 102. Further, the kickstand 304 includes a surface contact mechanism that reduces and/or prevents slippage on the surface 302, as well as enables the kickstand 304 to be held securely against the rear surface 306 when the kickstand 304 is in a closed position.

Figure 4:
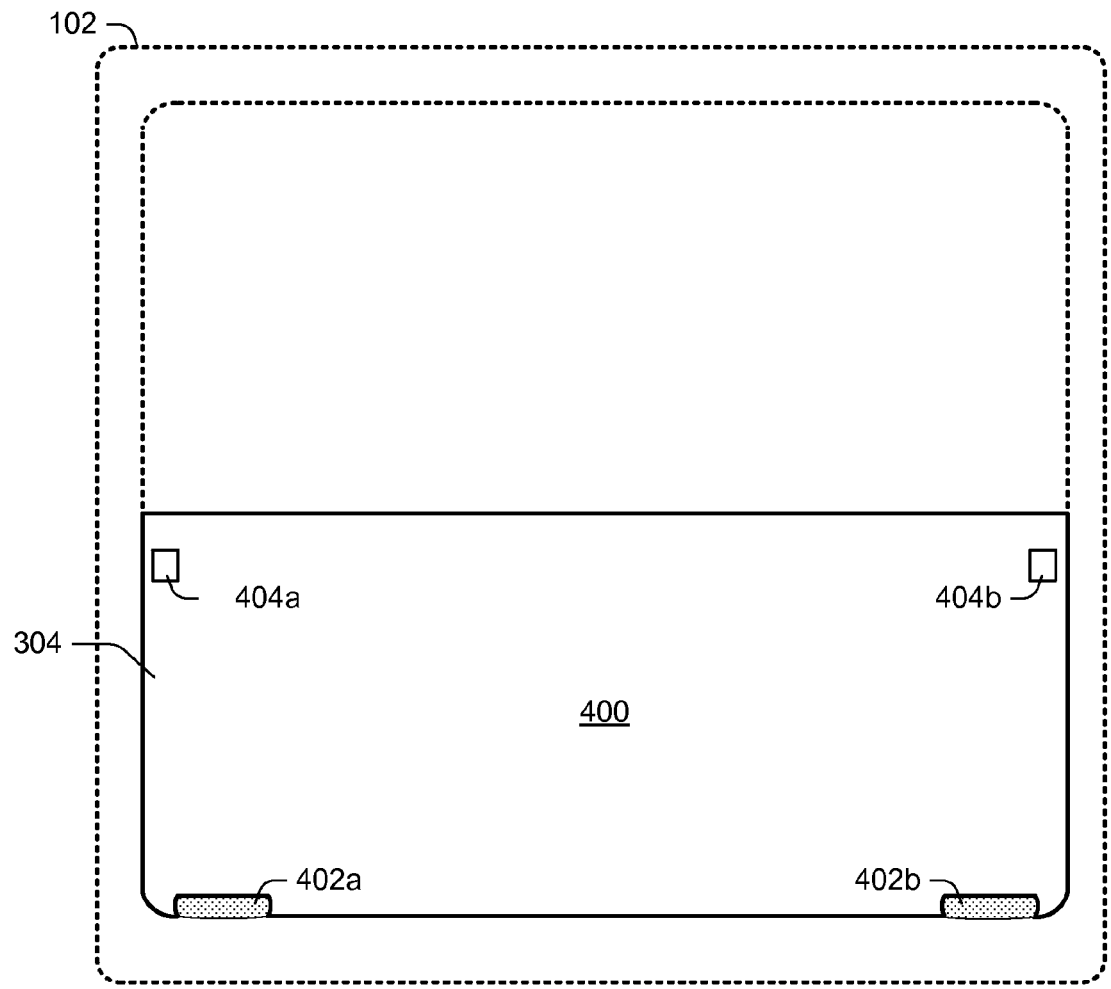
FIG. 4 depicts an example view of a support component with surface contacts in accordance with one or more embodiments.

FIG. 4 illustrates an inner surface 400 of the kickstand 304 in accordance with one or more embodiments. In this example, the kickstand 304 is illustrated in the context of an outline of the computing device 102.

The inner surface 400 includes surface contacts 402a and 402b, which function as surface interface points when the kickstand 304 is in an open position. The surface contacts 402a, 402b can be formed using a variety of types of slip-resistant materials, and can be positioned within a notch in the inner surface 400. For example, the surface contacts 402a, 402b can be formed from an elastic material, such as rubber, synthetic polymers, thermoplastics, and so forth. Examples of suitable materials include nylon, polypropylene, polyisoprene, and so on.

In at least some embodiments, the surface contacts 402a, 402b can be substantially dovetail shaped such that the surface contacts can be held within a dovetail notch in the inner surface 400 via elastic pressure. Additionally or alternatively, the surface contacts 402a, 402b can be affixed to the inner surface 400 via a suitable adhesive.

The surface contacts 402a, 402b are positioned on a bottom edge of the kickstand 304 such that when the kickstand 304 is open and resting on a surface, the surface contacts 402a, 402b serve as insulators between the kickstand 304 and the surface. For example, the surface contacts 402a, 402b can reduce the transmission of vibrations between the kickstand 304 and an adjacent surface. Further, the surface contacts 402a, 402b can reduce slippage of the kickstand 304 on a surface.

For instance, the surface contacts 402a, 402b can be formed from a material that resists slippage on a variety of different surfaces. Thus, when the computing device 102 is supported by the kickstand 304 (e.g., in the open position 300 discussed above), the surface contacts 402a, 402b can assist in stabilizing the computing device 102 and can reduce noise that can be caused by vibration of the kickstand 304 on a surface.

According to one or more embodiments, the surface contacts 402a, 402b are impregnated with a ferromagnetic material such that magnetic force is exerted on the surface contacts 402a, 402b when they are within a magnetic field. The surface contacts 402a, 402b, for example, can be infused (e.g., doped) with iron filings and/or other ferromagnetic particles that are attracted to a magnetic field.

In at least some embodiments, imparting ferromagnetic properties to the surface contacts 402a, 402b enables the surface contacts 402a, 402b to be employed as a fastening mechanism for the kickstand 304. For instance, when the kickstand 304 is in a closed position, the surface contacts 402a, 402b are attracted to magnets placed along an adjacent edge of the computing device 102. Thus, in the closed position the magnetic force exerted by the magnets on the surface contacts 402a, 402b can assist in holding the lower edge of the kickstand 304 against the computing device 102.

Figure 5:
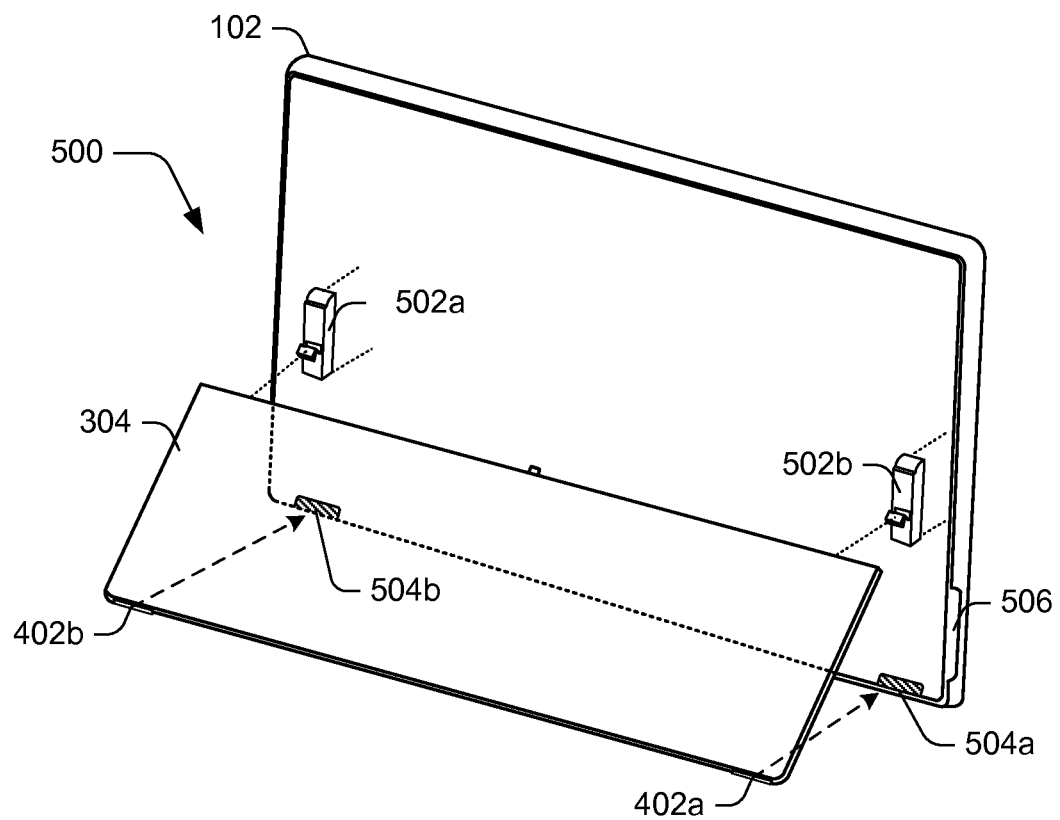
FIG. 5 depicts an example view of a support component with surface contacts and an attached computing device in accordance with one or more embodiments.

The inner surface 400 further includes hinge mounts 404a, 404b which function as mounting points for hinge mechanisms that are employed to attach the kickstand 304 to the computing device 102. Examples of hinge mechanisms are discussed below FIG. 5 illustrates an exploded rear view 500 of the computing device 102, including the kickstand 304. Included in the rear view 500 are hinges 502a and 502b, which can be employed to attach the kickstand 304 to the computing device 102. The hinges 502a, 502b are configured to be installed internally in the computing device 102, such as via a suitable attachment method and/or device.

The kickstand 304 can be attached to a pivoting portion of the hinges 502a, 502b via the peripheral hinge mounts 404a, 404b, discussed above with reference to FIG. 4. Thus, attachment to the hinges 502a, 502b enables the kickstand 304 to pivot between various positions with reference to the computing device 102.

The hinges 502a, 502b are installed in the computing device 102 such that when the kickstand 304 is rotated on the hinges to a closed position, the hinges 502a, 502b are not visible and the kickstand 304 forms a smooth contour with the chassis of the computing device 102. For example, see the closed position illustrated and discussed with reference to FIG. 7.

Also illustrated in the rear view 500 are the surface contacts 402a, 402b. As discussed above, the surface contacts 402a, 402b can stabilize the kickstand 304, and thus the computing device 102, when the kickstand 304 is in an open position and resting on a surface. In at least some embodiments, the surface contacts 402a, 402b are positioned in a groove in an inner surface of the kickstand 304 such that the surface contacts 402a, 402b are not externally visible when the kickstand 304 is in a closed position.

The computing device 102 further includes a magnet 504a and a magnet 504b, which are disposed along a bottom edge of the rear inside surface of the computing device 102. The magnets 504a, 504b can be implemented using any suitable magnetic material and/or mechanism, such as a permanent magnet, a rare-earth magnet, a composite magnet, an electromagnet, and so forth.

According to various embodiments, the magnets 504a, 504b are disposed such that when the kickstand 304 is in a closed position, the surface contacts 402a, 402b are positioned against and/or in close proximity to the magnets 504a, 504b, respectively. Thus, in the closed position, the magnets 504a, 504b exert magnetic force on the surface contacts 402a, 402b. The magnetic force holds the kickstand 304 in a closed position until sufficient force is applied (e.g., by a user) to open the kickstand 304.

To assist a user in opening the kickstand 304 from a closed position, a notch 506 is formed in an edge of the computing device 102. For instance, the notch 506 can enable a user to insert a small portion of a finger behind the closed kickstand 304, and apply pressure to manipulate the kickstand 304 to an open position. Additionally or alternatively, a notch can be formed in an edge of the kickstand 304 to assist in opening the kickstand 304.

Figure 6:
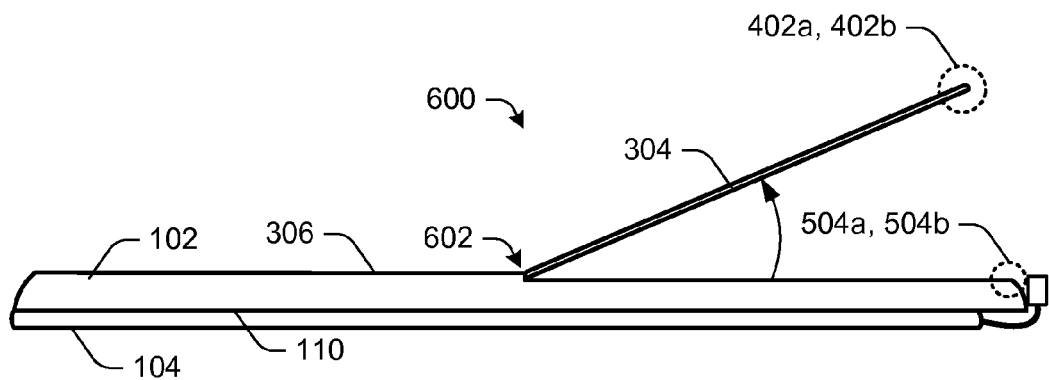
FIG. 6 depicts an example orientation of a support component relative to a computing device in accordance with one or more embodiments.

FIG. 6 illustrates that the kickstand 304 can be rotated away from the rear surface 306 of the computing device 102 to an open position 600. For instance, the kickstand 304 can be rotatably attached to the computing device 102 along a seam 602 via a hinge mechanism. An example of a suitable hinge mechanism is detailed above.

In at least some implementations, the position 600 corresponds to a preset position for the kickstand 304. For instance, when a user applies pressure to the kickstand 304 away from the rear surface 306, the kickstand 304 can snap into the position 600. According to various embodiments, a hinge mechanism employed to attach the kickstand 304 to the computing device 102 can utilize spring pressure and detent settings to provide preset open positions for the kickstand 304.

Further illustrated is that the surface contacts 402a, 402b are positioned along a bottom edge of the kickstand 304, and that the magnets 504a, 504b are positioned along a bottom rear edge of the computing device 102.

With the kickstand 304 in the position 600, the computing device 102 can be rotated away from the input device 104 and supported by the kickstand 304, such as illustrated in the position 300 of FIG. 3. Thus, the position 600 can enable the display device 110 to be viewed, and input to be provided to the computing device 102 via the input device 104. Further, the surface contacts 402a, 402b can provide a stable, reduced slippage contact mechanism to stabilize the kickstand 304 on an adjacent surface.

Figure 7:
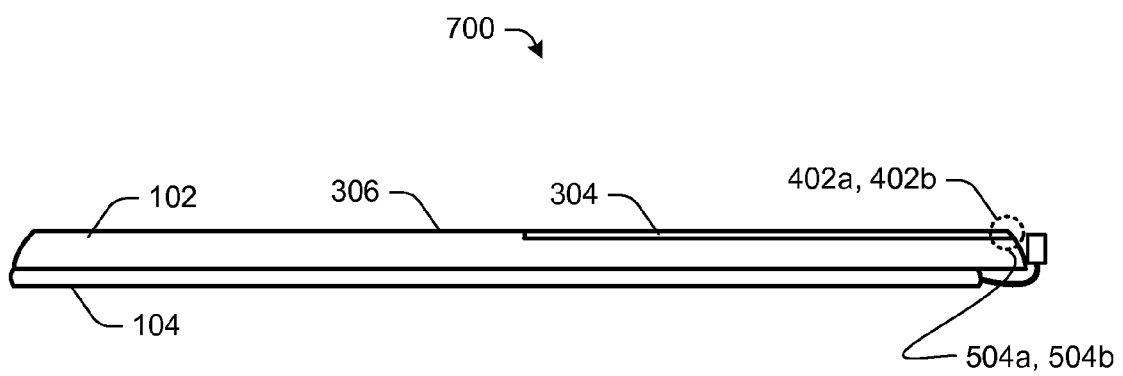
FIG. 7 depicts an example orientation of a support component relative to a computing device in accordance with one or more embodiments.

FIG. 7 illustrates a closed position 700 for the kickstand 304. In at least some embodiments, the closed position 700 corresponds to the orientation 200, discussed above with reference to FIG. 2. In the closed position 700, the kickstand 304 forms a portion of the rear surface 306 of the computing device 102 such that the kickstand 304 conforms to a surface contour of the computing device 102. For instance, when the kickstand 304 is in the closed position 700, the kickstand 304 integrates into the computing device 102 and does not protrude from a plane formed by the rear surface 306.

In the closed position 700, the surface contacts 402a, 402b are in contact with and/or close proximity to the magnets 504a, 504b such that the magnets 504a, 504b exert magnetic force on the surface contacts 402a, 402b. The magnetic force holds the kickstand 304 in the closed position 700 until sufficient force is applied (e.g., by a user) to open the kickstand 304.

Figure 8:
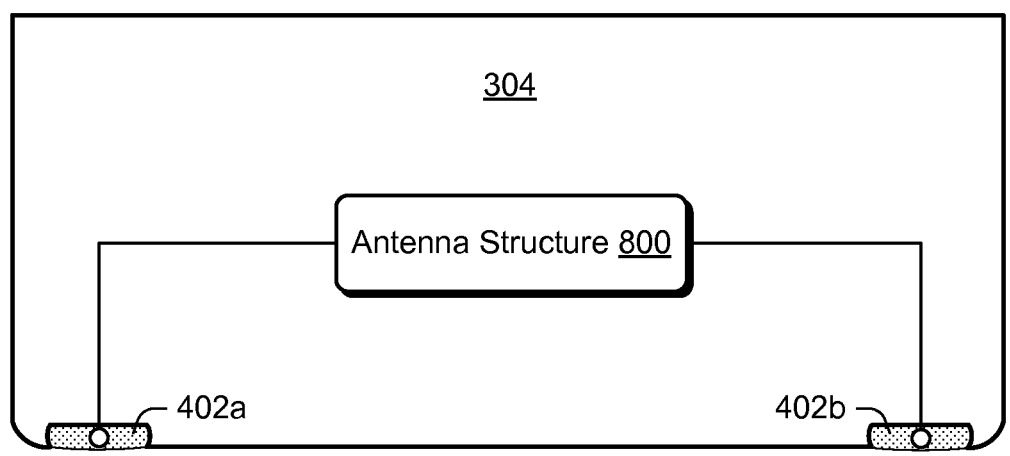
FIG. 8 depicts an example implementation of surface contacts as part of an antenna structure in accordance with one or more embodiments.

FIG. 8 illustrates that the surface contacts 402a, 402b can form part or all of an antenna structure 800 for the computing device 102. According to various embodiments, the antenna structure 800 can be operably attached to a radio transmitter and/or receiver of the computing device 102 to provide wireless signal reception and/or transmission for the computing device 102.

For instance, the ferromagnetic material embedded in the surface contacts 402a, 402b can be arranged to transmit and/or receive wireless signals according to a variety of different techniques and/or protocols. Examples of such techniques and/or protocols include the 802.11 protocols, Bluetooth, cellular communications (e.g., cell phones), radio communications, and so on.

In at least some embodiments, the ferromagnetic material can be formed as a connected conducting structure within the surface contacts 402a, 402b. Further, the surface contacts 402a, 402b can be electrically connected to functionalities (e.g., a radio) of the computing device 102 via various connection techniques, such as via wires, conductive pathways, tracks, signal traces, and so forth. Thus, in at least some embodiments, the surface contacts 402a, 402b can be implemented as an antenna and/or antennas embedded in a slip-resistant material.

Thus, the surface contacts 402a, 402b can provide multiple different functions, including slip-resistance for the kickstand 304 in an open position, a hold mechanism for the kickstand 304 in a closed position, and an antenna structure for the computing device 102. In at least some embodiments, these functions can be provided via a single integrated structure.

While a number of example orientations and positions are discussed herein, it is to be appreciated that a variety of other orientations and positions not expressly illustrated or discussed are also supported in accordance with various embodiments. Further, the illustrated placement positions for the surface contacts 402a, 402b and the magnets 504a, 504b are presented for purpose of example only, and the surface contacts 402a, 402b and/or the magnets 504a, 504b can be placed in a variety of different positions in accordance with various embodiments.

Example System and Device

Figure 9:
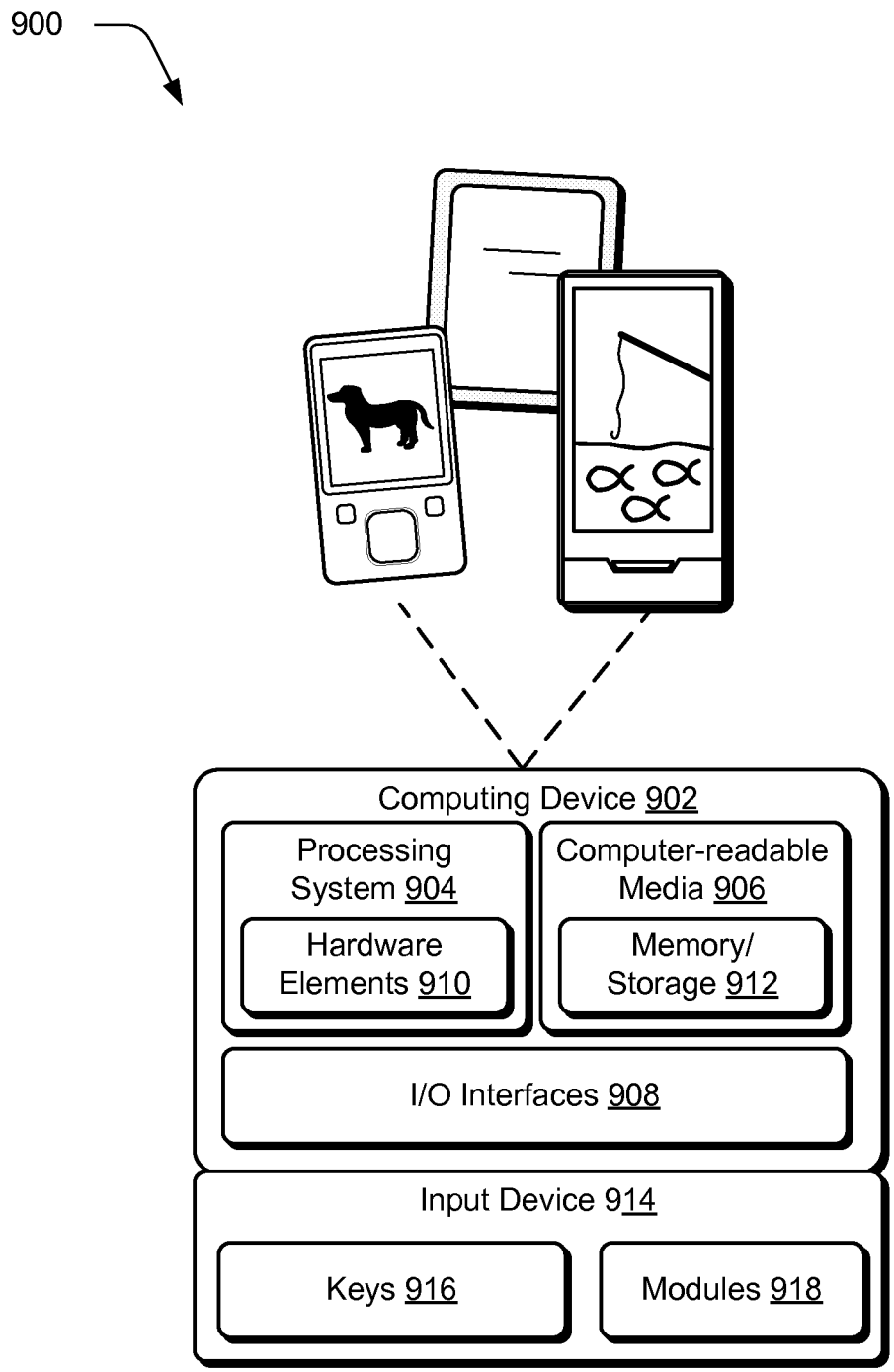
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. The computing device 902 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways to support user interaction.

The computing device 902 is further illustrated as being communicatively and physically coupled to an input device 914 that is physically and communicatively removable from the computing device 902. In this way, a variety of different input devices may be coupled to the computing device 902 having a wide variety of configurations to support a wide variety of functionality. In this example, the input device 914 includes one or more keys 916, which may be configured as pressure sensitive keys, mechanically switched keys, and so forth.

The input device 914 is further illustrated as include one or more modules 918 that may be configured to support a variety of functionality. The one or more modules 918, for instance, may be configured to process analog and/or digital signals received from the keys 916 to determine whether a keystroke was intended, determine whether an input is indicative of resting pressure, support authentication of the input device 914 for operation with the computing device 902, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein may generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
a device chassis including one or more magnets along at least one edge;
a support component attached to the device chassis and positionable in multiple positions relative to the device chassis to support one or more orientations of the device chassis relative to an adjacent surface; and
one or more surface contacts disposed along an edge of the support component and being formed from a slip-resistant material impregnated with particles of a ferromagnetic material such that:
the one or more surface contacts reduce slippage of the support component on an adjacent surface when the support component is in an open position relative to the device chassis; and
the one or more magnets exert magnetic force on the surface contacts to hold the support component against the at least one edge when the support component is in a closed position relative to the device chassis.

2. An apparatus as recited in claim 1, wherein the apparatus comprises a computing device, the device chassis comprises a display device, and wherein the display device is viewable when the support component is in the open position.

3. An apparatus as recited in claim 1, wherein the slip-resistant material comprises at least one of nylon, polypropylene, or rubber.

4. An apparatus as recited in claim 1, wherein the ferromagnetic material comprises at least one of iron particulate or a ferromagnetic alloy particulate.

5. An apparatus as recited in claim 1, wherein the one or more surface contacts are positioned within a dovetail notch within the edge of the support component.

6. An apparatus as recited in claim 1, wherein the one or more surface contacts are positioned such that the one or more surface contacts are not externally visible when the support component is in the closed position relative to the device chassis.

7. An apparatus as recited in claim 1, wherein the apparatus comprises a computing device, and wherein the one or more surface contacts form at least part of an antenna structure for one or more of transmitting or receiving wireless signals for the computing device.

8. An apparatus as recited in claim 1, wherein the one or more surface contacts form at least part of an antenna structure for the device chassis.

9. A support component comprising:
one or more surface contacts disposed along an edge of the support component and being formed from a slip-resistant material impregnated with particles of a ferromagnetic material, the one or more surface contacts being configured to reduce slippage of the support component on an adjacent surface when the support component is in an open position relative to an attached device chassis, and to hold the support component against at least one edge of the device chassis when the support component is in a closed position relative to the device chassis and based on magnetic attraction between one or more magnets disposed within the device chassis and the ferromagnetic material.

10. A support component as recited in claim 9, wherein the device chassis comprises at least a portion of a computing device, and wherein the open position corresponds to a viewing position for a display device of the computing device.

11. A support component as recited in claim 9, wherein the slip-resistant material comprises at least one of nylon, polypropylene, or rubber.

12. A support component as recited in claim 9, wherein the ferromagnetic material comprises at least one of iron particulate or a ferromagnetic alloy particulate.

13. A support component as recited in claim 9, wherein the one or more surface contacts are positioned such that the one or more surface contacts are not externally visible when the support component is in the closed position relative to the device chassis.

14. A support component as recited in claim 9, wherein the device chassis comprises a computing device, and wherein the one or more surface contacts form at least part of an antenna structure for one or more of transmitting or receiving wireless signals for the computing device.

15. A support component as recited in claim 9, wherein the one or more surface contacts form at least part of an antenna structure for the device chassis.

16. A surface contact for a support component, the surface contact comprising a surface contact body formed from a slip-resistant material with particles of a ferromagnetic material impregnated therein, the surface contact body being configured to be attached to the support component to reduce slippage of the support component on an adjacent surface when the support component is in an open position relative to an attached device chassis, and to hold the support component against at least one edge of the device chassis when the support component is in a closed position relative to the device chassis and based on magnetic attraction between one or more magnets disposed within the device chassis and the ferromagnetic material.

17. A surface contact as described in claim 16, wherein the slip-resistant material comprises at least one of nylon, polypropylene, or rubber, and the ferromagnetic material comprises at least one of iron particulate or a ferromagnetic alloy particulate.

18. A surface contact as described in claim 16, wherein the one or more surface contacts are positioned such that the one or more surface contacts are not externally visible when the support component is in the closed position relative to the device chassis.

19. A surface contact as described in claim 16, wherein the device chassis comprises a computing device, and wherein the surface contact forms at least part of an antenna structure for one or more of transmitting or receiving wireless signals for the computing device.

20. A surface contact as described in claim 16, wherein the surface contact forms at least part of an antenna structure for the device chassis.

* * * * *